US011890251B1

(12) United States Patent
Zhou

(10) Patent No.: US 11,890,251 B1
(45) Date of Patent: Feb. 6, 2024

(54) MASSAGER HAVING STRETCHING AND EXPANSION FUNCTIONS

(71) Applicant: DONGGUAN AISI HEALTH PRODUCTS CO., LTD., Dongguan (CN)

(72) Inventor: Biao Zhou, Gaoan (CN)

(73) Assignee: DONGGUAN AISI HEALTH PRODUCTS CO., LTD., Dongguan (CN)

(*) Notice: Subject to any disclaimer, the term of this patent is extended or adjusted under 35 U.S.C. 154(b) by 0 days.

(21) Appl. No.: 18/361,913

(22) Filed: Jul. 31, 2023

(30) Foreign Application Priority Data

Apr. 18, 2023 (CN) ......................... 202320880143.0

(51) Int. Cl.
*A61H 19/00* (2006.01)
*A61H 23/02* (2006.01)
*A61H 21/00* (2006.01)

(52) U.S. Cl.
CPC ............. *A61H 19/44* (2013.01); *A61H 21/00* (2013.01); *A61H 23/0254* (2013.01); *A61H 2201/0153* (2013.01)

(58) Field of Classification Search
CPC ........ A61H 19/40; A61H 19/44; A61H 21/00; A61H 19/00; A61H 23/0254; A61H 2201/0153; A61M 29/02; A61M 29/00; A61B 1/32
See application file for complete search history.

(56) References Cited

U.S. PATENT DOCUMENTS 5,795,289 A * 8/1998 Wyttenbach ............. A61B 1/32
606/198
7,828,717 B2 * 11/2010 Lee ........................ A61H 19/34
600/38
8,419,664 B2 * 4/2013 Knyrim ............. A61H 23/0254
600/38
9,066,843 B1 * 6/2015 Greco .................... A61H 19/44
10,231,902 B2 * 3/2019 Yueh ...................... A61H 19/44
(Continued)

FOREIGN PATENT DOCUMENTS

CN 109260001 A * 1/2019
CN 115531165 A * 12/2022

OTHER PUBLICATIONS

English translation for CN 109260001, machine translated by Search Clarivate Analytics, translated on Sep. 20, 2023.*
(Continued)

*Primary Examiner* — Tu A Vo

(57) ABSTRACT

A massager includes a flexible outer housing, a driving housing, and an inclined expansion fastener. An upper end of the driving housing is cut into a plurality of elastic sheets. A cavity is defined at the upper end of the driving housing, and the inclined expansion fastener is partially disposed in the cavity. When the inclined expansion fastener moves downward, the inclined expansion fastener opens the plurality of the elastic sheets, so that a diameter of the upper end of the driving housing is increased; and when the inclined expansion fastener moves upward, the inclined expansion fastener moves out of the cavity at the upper end of the driving housing, the plurality of the elastic sheets rebound and reset, and the diameter of the upper end of the driving housing is restored.

19 Claims, 4 Drawing Sheets

(56) References Cited

U.S. PATENT DOCUMENTS

| | | | | |
|---|---|---|---|---|
| 11,135,129 | B2 * | 10/2021 | Greco | A61H 23/02 |
| 2009/0099413 | A1 * | 4/2009 | Kobashikawa | A61H 19/44 600/38 |
| 2014/0309565 | A1 * | 10/2014 | Allen | A61H 19/44 601/46 |
| 2017/0224580 | A1 * | 8/2017 | Yueh | A61H 23/0254 |
| 2018/0193619 | A1 * | 7/2018 | Juravic | A61B 17/42 |
| 2019/0262591 | A1 * | 8/2019 | Jayol | A61M 29/00 |
| 2021/0008357 | A1 * | 1/2021 | Jayol | A61M 29/02 |

OTHER PUBLICATIONS

English translation for CN 115531165, machine translated by Search Clarivate Analytics, translated on Sep. 20, 2023.*

* cited by examiner

MASSAGER HAVING STRETCHING AND EXPANSION FUNCTIONS

TECHNICAL FIELD

The present disclosure relates to a technical field of massagers, and in particular to a massager having stretching and expansion functions.

BACKGROUND

Current massagers work to appropriately stretch and expand in a human body cavity, so that a contact area between the massagers and human body skin is increased to bring more stimulus for the human body skin, and user experience may further be improved. However, most of the current massagers achieve a massage function through vibrating, rotating, stretching, etc., which is relatively single in functions and cannot stimulate receptors in the human body skin, moreover, the current massagers cannot enlarge a diameter while stretching, thereby leading to a decline in the user experience.

SUMMARY

In view of this, the present disclosure aims to provide a massager having expansion function to solve a problem that current massagers cannot stretch while expanding.

The present disclosure provides a massager, including a flexible outer housing, a driving housing, and an inclined expansion fastener. An upper end of the driving housing is cut into a plurality of elastic sheets. A first cavity is defined at the upper end of the driving housing, and the inclined expansion fastener is partially disposed in the first cavity. When the inclined expansion fastener moves downward, the inclined expansion fastener opens the plurality of the elastic sheets, so that a diameter of the upper end of the driving housing is increased; and when the inclined expansion fastener moves upward, the inclined expansion fastener moves out of the first cavity at the upper end of the driving housing, the plurality of the elastic sheets rebound and reset, and the diameter of the upper end of the driving housing is restored.

Furthermore, a groove is defined in the upper end of the driving housing to form a stretchable and movable cavity, and elastic sheet grooves are disposed at a bottom of the stretchable and movable cavity. The elastic sheet grooves penetrate through the stretchable and movable cavity and the upper end of the driving housing to form the plurality of the elastic sheets.

Furthermore, widths of the elastic sheet grooves are consistent.

Furthermore, widths of the elastic sheet grooves are inconsistent.

Furthermore, a plurality of arc-shaped protrusions are disposed on an outward surface of each of the plurality of the elastic sheets, and heights of the plurality of the arc-shaped protrusions progressively decrease downward along a length direction of each of the plurality of the elastic sheets.

Furthermore, the massager further includes a driving assembly. The driving assembly includes a driving unit, a guide tooth, a driving shaft, a driving bottom housing, and a driving surface housing. The driving surface housing is disposed on a surface of the driving assembly, the inclined expansion fastener is assembled at a top portion of the driving surface housing, and an outer surface of the driving surface housing extends outward to form a plurality of surface housing clamping columns.

Furthermore, a fastener through hole is defined in the inclined expansion fastener, a plurality of fastener grooves are concavely disposed in the fastener through hole. The plurality of the surface housing clamping columns are clamped in the plurality of the fastener grooves, so as to complete assembly of the driving assembly and the inclined expansion fastener. When the driving assembly moves up and down, the plurality of the surface housing clamping columns clamped in the plurality of the fastener grooves drive the inclined expansion fastener to move up and down.

Furthermore, a plurality of inclined surfaces extend outward from an outer portion of the inclined expansion fastener, and the plurality of the inclined surfaces are surrounded on the outer portion of the inclined expansion fastener.

Furthermore, an end of each of the plurality of the inclined surfaces facing the driving assembly is a first end, and an end of each of the plurality of the inclined surfaces facing an opposite position of the driving assembly is a second end. A height of the first end is lower than a height of the second end.

Furthermore, a plurality of guide grooves are disposed on a surface of each of the plurality of the inclined surfaces, and a direction of each of the plurality of the guide grooves is consistent with a motion direction of the inclined expansion fastener.

Furthermore, spacing grooves are disposed between the plurality of the inclined surfaces, and the spacing grooves separate the plurality of the inclined surfaces.

Furthermore, a width of each of the spacing grooves is not less than a width of each of the plurality of the guide grooves.

Furthermore, an annular platform is disposed at lower portions of the plurality of the inclined surfaces and surrounds the plurality of the inclined surfaces, a diameter of the annular platform is consistent with a diameter of the first cavity defined at the upper end of the driving housing.

Furthermore, a height of the first end of each of the plurality of the inclined surfaces is not greater than a height of the annular platform.

Furthermore, the plurality of the elastic sheets are made of elastic materials.

Furthermore, the guide tooth is configured in a semi-circular arc shape, and a bottom of the semi-circular arc shape extends outward to form a guide column.

Furthermore, the driving shaft is cylindrical, and a guide rail surrounds an outer surface of the driving shaft. The semi-circular arc shape of the guide tooth is clamped on the outer surface of the driving shaft.

Furthermore, a first shaft through hole and a plurality of surface housing through holes are defined in the driving surface housing. A second shaft through hole and a plurality of bottom housing through holes are defined in the driving bottom housing, and the plurality of the bottom housing through holes correspond to the plurality of the surface housing through holes.

Furthermore, a plurality of driving columns extend out from a top portion of the driving unit, the plurality of the driving columns sequentially pass through the plurality of the bottom housing through holes and the plurality of the surface housing through holes, and the driving shaft sequentially passes through the second shaft through hole in the driving bottom housing and the first shaft through hole in the driving surface housing.

Furthermore, a first tooth groove is defined at an edge, facing the first shaft through hole, of a bottom portion of the driving surface housing, a second tooth groove is defined at an edge, facing the second shaft through hole, of a top portion of the driving bottom housing. The bottom portion of the driving surface housing is stacked with the top portion of the driving bottom housing, a second cavity is defined in the first tooth groove and the second tooth groove, and the guide tooth is clamped in the second cavity.

Compared with the prior art, the present disclosure has following beneficial effects.

Different from the current massagers that the current massagers achieve functions of vibration and stretching through a simple direct current (DC) motor, the massager of the present disclosure is capable of stretching while expanding through a mechanism structure. The plurality of the elastic sheets are opened through the plurality of the inclined surfaces on the inclined expansion fastener, so that an overall diameter of one end of the flexible outer housing of the massager is increased, and the one end of the flexible outer housing of the massager is properly expanded and enlarged in a human body cavity, so that a contact area between the massager and human body skin is increased to bring more stimulus for the human body skin, and user experience may further be improved. The massager of the present disclosure solves problems of single linear stretching function and poor user experience.

Figure 1:
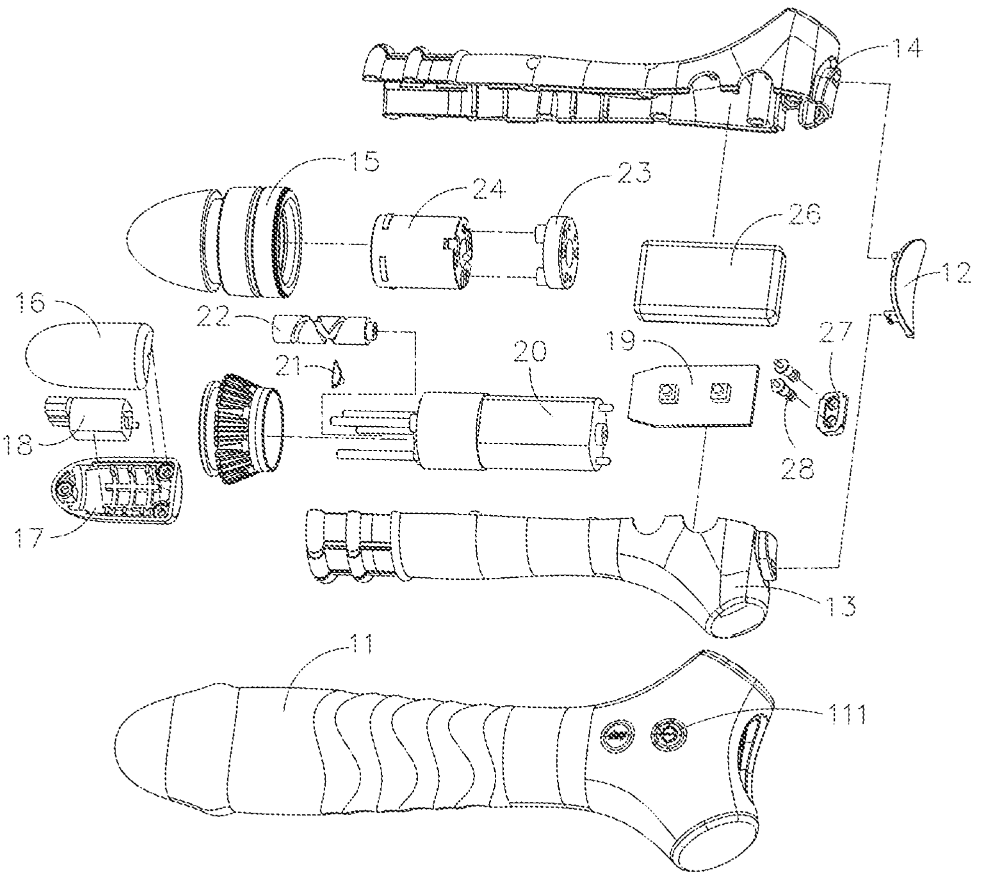
FIG. 1 is a structural schematic diagram of a massager having stretching and expansion functions of the present disclosure.

Reference numerals in the drawings: 10. driving housing; 101. elastic sheet; 102. stretchable and movable cavity; 103. elastic sheet groove; 11. flexible outer housing; 111. control button; 12. hard outer housing; 13. left driving housing; 131. right elastic sheet; 1311. arc-shaped protrusion; 132. stretchable and left-movable cavity; 133. left elastic sheet groove; 14. right driving housing; 141. right elastic sheet; 142. stretchable and right-movable cavity; 143. right elastic sheet groove; 15. flexible soft filling glue; 16. left vibrating housing; 17. right vibrating housing; 18. vibrating motor; 19. control circuit board; 20. driving unit; 201. driving assembly; 202. driving column; 21. guide tooth; 211. guide column; 22. driving shaft; 221.guide rail; 23. driving bottom housing; 231. bottom housing through hole; 232. second tooth groove; 24. driving surface housing; 241. surface housing clamping column; 242. shaft through hole; 243. surface housing through hole; 244. first tooth groove; 25. inclined expansion fastener; 251. inclined surface; 2511. first end; 2512. second end; 2513. guide groove; 2514. spacing groove; 2515. annular platform; 252. fastener through hole; 253. fastener groove; 26. driving battery; 27. conductive pin fixing base; 28. conductive pin.

DETAILED DESCRIPTION

Technical solutions in embodiments of the present disclosure are clearly and completely described below with reference to accompanying drawings in the embodiments of the present disclosure. Obviously, the described embodiments are only a part of the embodiments of the present disclosure, but are not all embodiments. All other embodiments obtained by a person skilled in the art based on the embodiments of the present disclosure without creative efforts shall fall within protection scopes of the present disclosure.

Figure 2:
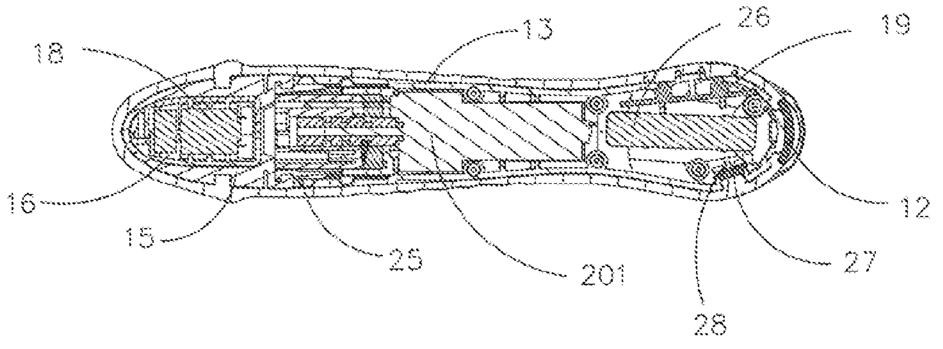
FIG. 2 is a cross-sectional schematic diagram of the massager of the present disclosure.
Figure 3:
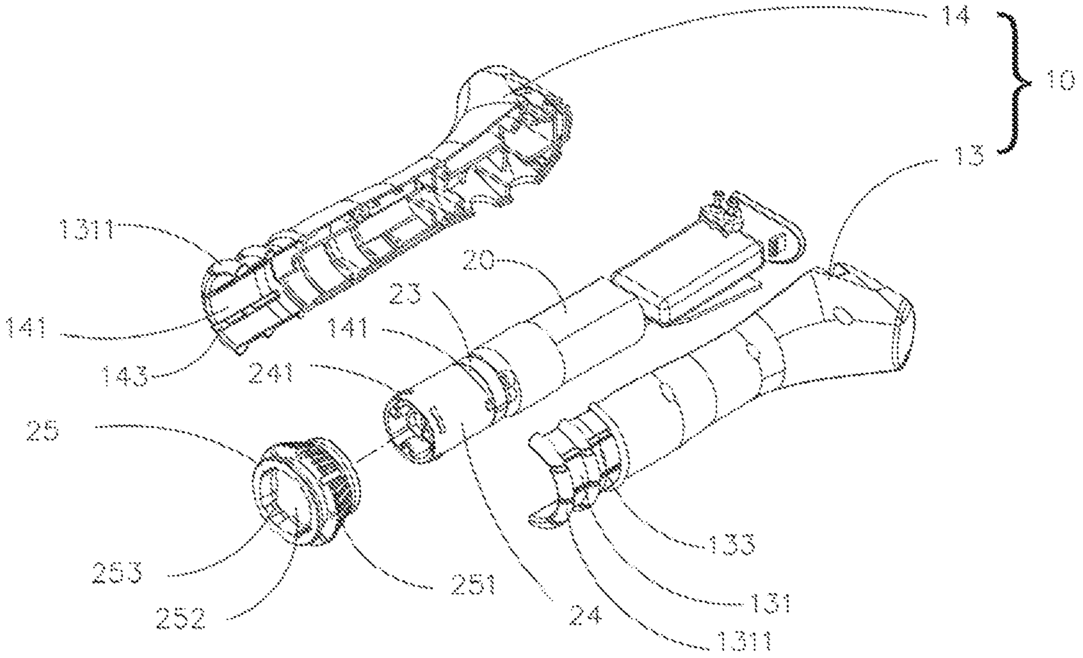
FIG. 3 is a structural schematic diagram of a stretching structure of the massager of the present disclosure.
Figure 4:
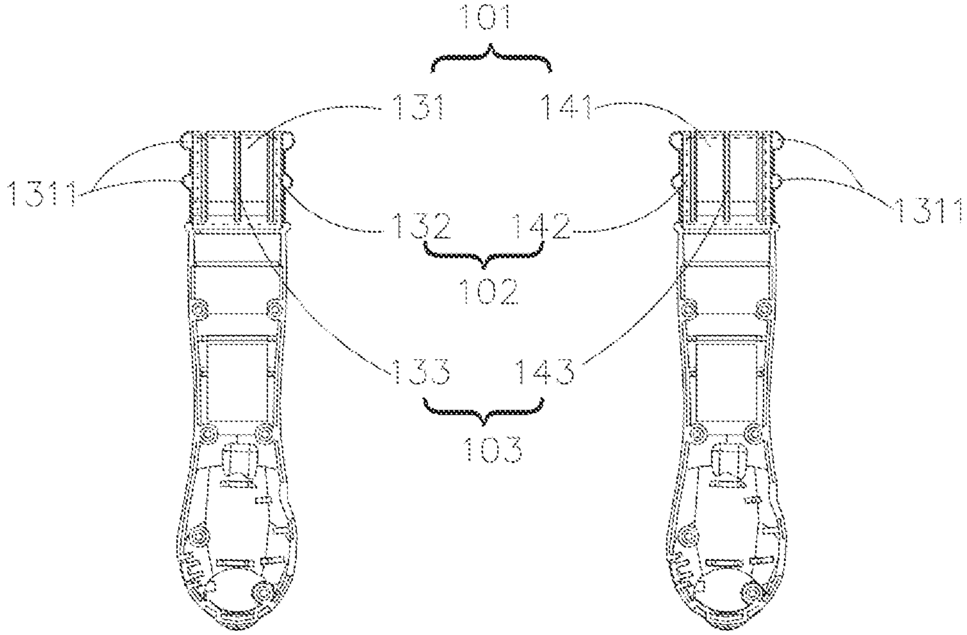
FIG. 4 is a structural schematic diagram of a left driving housing and a right driving housing of the massager of the present disclosure.
Figure 5:
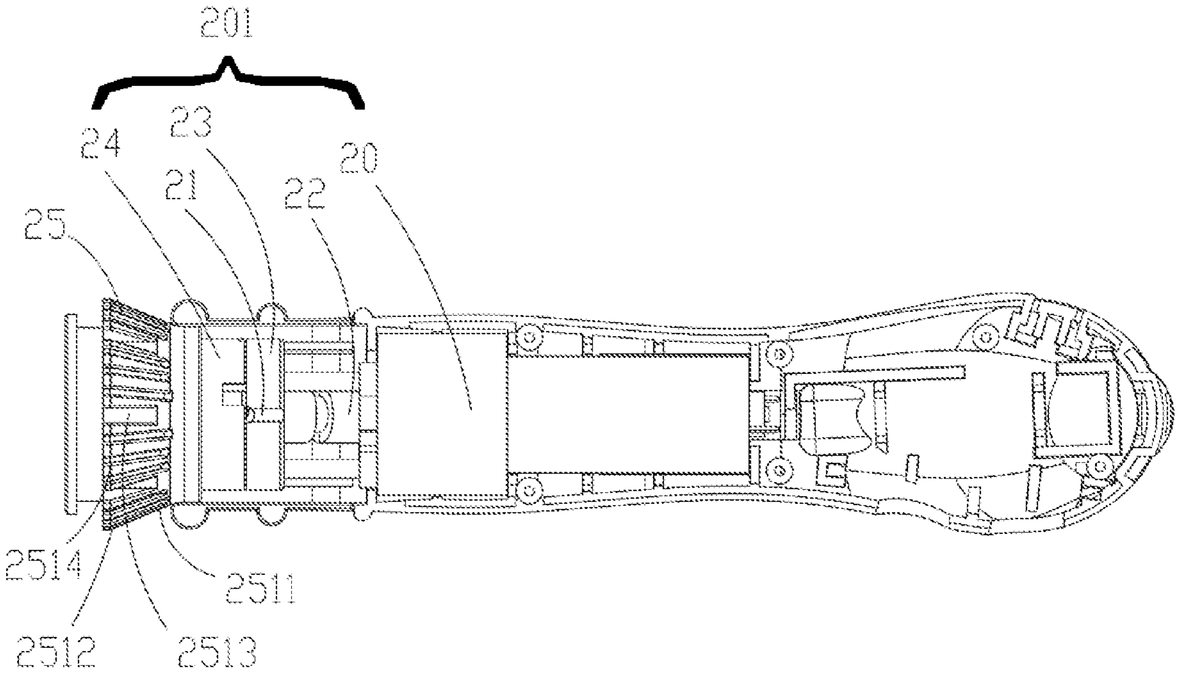
FIG. 5 is a structural schematic diagram of the massager of the present disclosure where the massager is in a static state.
Figure 6:
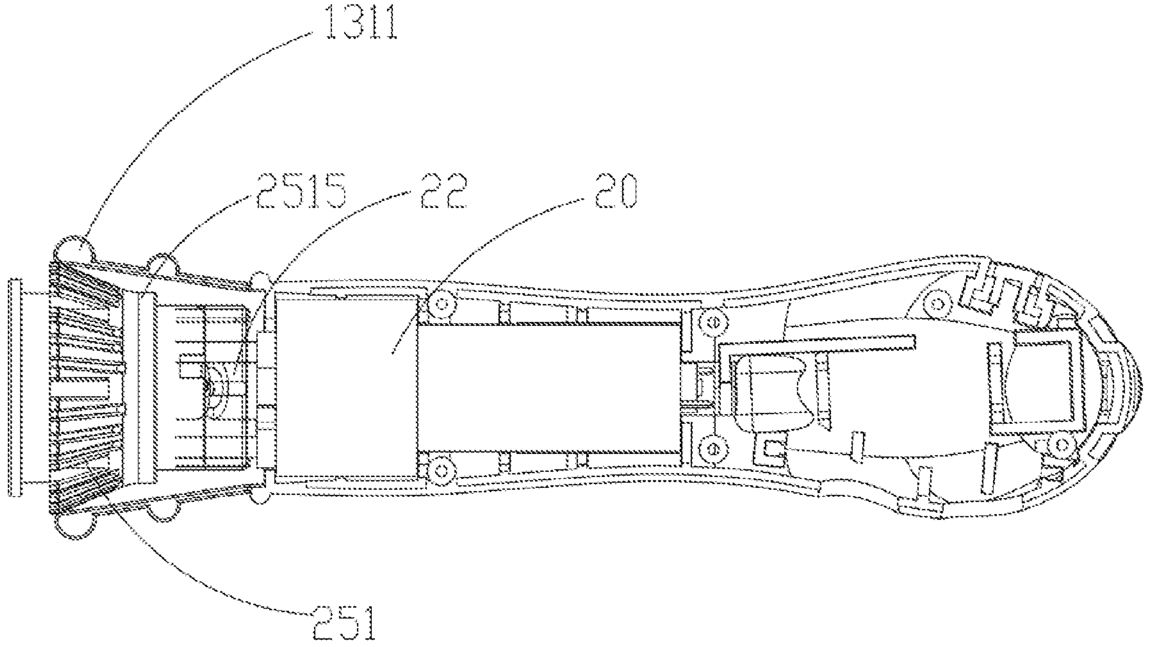
FIG. 6 is a structural schematic diagram of the massager of the present disclosure where the massager is in a downward compressed state.
Figure 7:
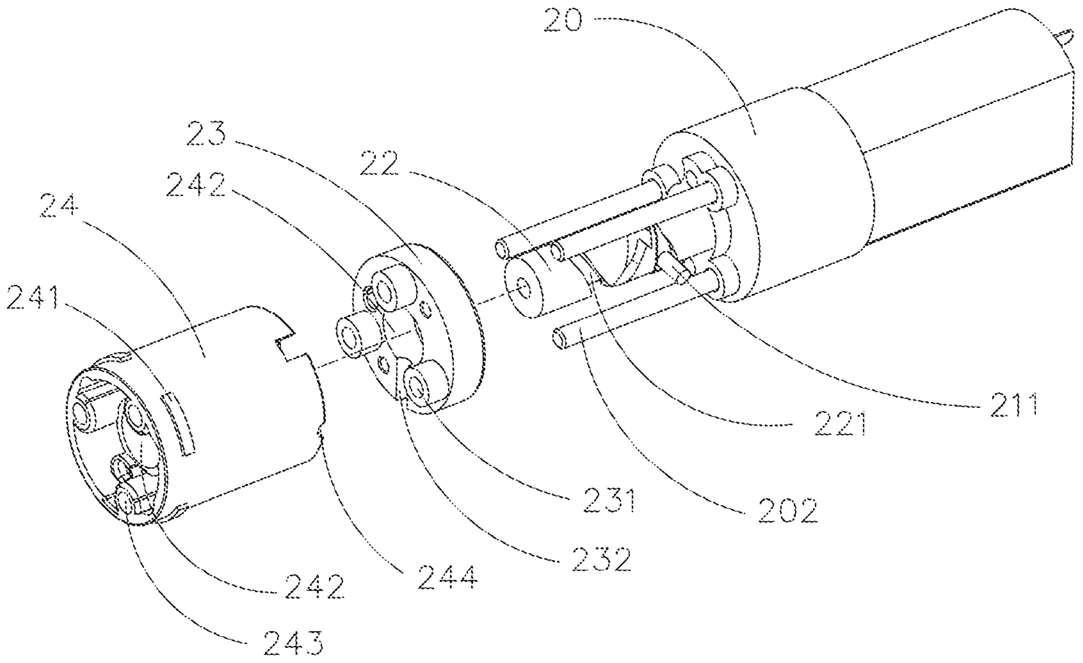
FIG. 7 is a second structural schematic diagram of a driving assembly of the massager of the present disclosure.
Figure 8:
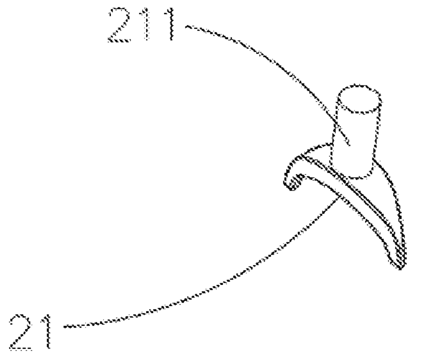
FIG. 8 is a structural schematic diagram of a guide tooth of the massager of the present disclosure.

Please refer to FIGS. 1-8, the present disclosure provides a technical solution as follows.

A massager having stretching and expansion functions includes a flexible outer housing 11, a hard outer housing 12, a left vibrating hosing 16, a right vibrating housing 17, and a vibrating motor 18. The flexible outer housing 11 covers a top portion and a middle portion of an outer surface of the massager, the hard outer housing 12 is disposed at a bottom portion of the outer surface of the massager, which is convenient for users to hold and control the massager. The vibrating motor 18 is disposed in inner portions of the left vibrating housing 16 and the right vibrating housing 17. Flexible soft filling glue 15 is filled between the left vibrating housing 16, the right vibrating housing 17, and the flexible outer housing 11. When a top portion of the massager enters a human body cavity, contact feeling of the users is relatively soft, so that the user experience is improved. The massager further includes a driving housing 10 and an inclined expansion fastener 25. The driving housing 10 includes a left driving housing 13 and a right driving housing 14. An upper end of the driving housing 10 is cut into a plurality of elastic sheets 101. The plurality of the elastic sheets 101 include a plurality of left elastic sheets 131 and a plurality of right elastic sheets 141. An upper end of the left driving housing 13 is cut into the plurality of the left elastic sheets 131, and an upper end of the right driving housing 14 is cut into the plurality of the right elastic sheets 141. The plurality of the left elastic sheets 131 and the plurality of the right elastic sheets 141 may be sheet-shaped, strip-shaped, and block-shaped structures. A first cavity is defined at the upper end of the driving housing 10 being assembled by the left driving housing 13 and the right driving housing 14, the first cavity is a stretchable and movable cavity 102, the inclined expansion fastener 25 is partially disposed in the stretchable and movable cavity 102, and the stretchable and movable cavity 102 includes a stretchable and left-movable cavity 132 and a stretchable and right-movable cavity 142. A plurality of inclined surfaces 251 extend outward from an outer portion of the inclined expansion fastener 25, the plurality of the inclined surfaces 251 are configured as slopes having slope gradient, and the plurality of the inclined surfaces 251 are surrounded on the outer portion of the inclined expansion fastener 25. The greater the slop gradient of the plurality of the inclined surfaces 251, the greater the deformation of the plurality of the left elastic sheets 131 and the plurality of the right elastic sheets 141, an outward displacement of the plurality of the left elastic sheets 131 and the plurality of the right elastic sheets 141 becomes larger, resulting in an increase in a size of the driving housing 10 being assembled by the left driving housing 13 and the right driving housing 14.

An end of each of the plurality of the inclined surfaces 251 facing a driving assembly 201 is a first end 2511, and an end of each of the plurality of the inclined surfaces 251 facing an opposite position of the driving assembly 201 is a second end 2512. A height of the first end 2511 is lower than a height of the second end 2512. A plurality of guide grooves 2513 are disposed on a surface of each of the plurality of the inclined surfaces 251, and a direction of each of the plurality of the guide grooves 2513 is consistent with a motion direction of the inclined expansion fastener 25. When the plurality of the inclined surfaces 251 are compressed toward the driving assembly 201, the first end 2511 of each of the plurality of the inclined surfaces 251 enters the stretchable and left-movable cavity 132 and the stretchable and right-movable cavity 142, the plurality of the inclined surfaces 251 more smoothly open the plurality of the left elastic sheets and the plurality of the right elastic sheets in a more accurate direction.

In the embodiment, spacing grooves 2514 are disposed between the plurality of the inclined surfaces 251, and the spacing grooves 2514 separate the plurality of the inclined surfaces 2514. A width of each of the spacing grooves 2514 is not less than a width of each of the plurality of guide grooves 2513.

In the embodiment, an annular platform 2515 is disposed at lower portions of the plurality of the inclined surfaces 251 and surrounds the plurality of the inclined surfaces 251, a diameter of the annular platform 2515 is consistent with a diameter of the first cavity between the plurality of the left elastic sheets 131 and the plurality of the right elastic sheets 141. The plurality of the left elastic sheets 131 and the plurality of the right elastic sheets 131 may be placed on a surface of the annular platform 2515, which is convenient for the plurality of the inclined surfaces 251 to more smoothly open the plurality of the left elastic sheets 131 and the plurality of the right elastic sheets 141.

In the embodiment, the plurality of the left elastic sheets 131 and the plurality of the right elastic sheets 141 are made of elastic materials.

When the inclined expansion fastener 25 moves downward, the plurality of the inclined surfaces 251 open the plurality of the left elastic sheets 131 and the plurality of the right elastic sheets 141, so that a diameter of the upper end of the driving housing 10 being assembled by the left driving housing 13 and the right driving housing 14 is increased; and when the inclined expansion fastener 25 moves upward, the plurality of the inclined surfaces 251 moves out of the first cavity between the left driving housing 13 and the right driving housing 14, the plurality of the left elastic sheets 131 and the plurality of the right elastic sheets 141 rebound and reset, and the diameter of the upper end of the driving housing 10 being assembled by the left driving housing 13 and the right driving housing 14 is restored.

A first groove is defined in an upper end of the left driving housing 13 to form the stretchable and left-movable cavity 132, and left elastic sheet grooves 133 are disposed at a bottom of the stretchable and left-movable cavity 132. The left elastic sheet grooves 133 penetrate through the stretchable and left-movable cavity 132 and the upper end of the left driving housing 13 to form the plurality of the left elastic sheets 131.

In the embodiment, a second groove is defined in an upper end of the right driving housing 14 to form the stretchable and right-movable cavity 142, and right elastic sheet grooves 143 are disposed at a bottom of the stretchable and right-movable cavity 142. The right elastic sheet grooves 143 penetrate through the stretchable and right-movable cavity 142 and the upper end of the right driving housing 14 to form the plurality of the right elastic sheets 141.

The left elastic sheet grooves 133 and the right elastic sheet grooves 143 form an elastic sheet groove 103.

When widths of the left elastic sheet grooves 133 are consistent, widths of the right elastic sheet grooves 143 may be consistent, or may not be consistent.

When the widths of the left elastic sheet grooves 133 are not consistent, the widths of the right elastic sheet grooves 143 may be consistent, or may not be consistent.

The widths of the left elastic sheet grooves 133 may be consistent with the widths of the right elastic sheet grooves 143, or may not be consistent.

In the embodiment, a plurality of arc-shaped protrusions 1311 are disposed on an outward surface of each of the plurality of the left elastic sheets 131 and the plurality of the right elastic sheets 141, and heights of the plurality of the arc-shaped protrusions 1311 progressively decrease downward along a length direction of each of the plurality of the elastic sheets 103.

In the embodiment, the massager further includes a driving assembly 201. The driving assembly 201 includes a driving unit 20, a guide tooth 21, a driving shaft 22, a driving bottom housing 23, and a driving surface housing 24. The driving surface housing 24 is disposed on a surface of the driving assembly 201, the inclined expansion fastener 25 is assembled at a top portion of the driving surface housing 24, and an outer surface of the driving surface housing 24 extends outward to form a plurality of surface housing clamping columns 241.

In the embodiment, a fastener through hole 252 is defined in the inclined expansion fastener 25, a plurality of fastener grooves 253 are concavely disposed in the fastener through hole 252. The plurality of the surface housing clamping columns 241 are clamped in the plurality of the fastener grooves 253, so as to complete assembly of the driving assembly 201 and the inclined expansion fastener 25. When the driving assembly 201 moves up and down, the plurality of the surface housing clamping columns 241 clamped in the plurality of the fastener grooves 253 drive the inclined expansion fastener 25 to move up and down, so that the inclined expansion sheet 25 is more stable in a process of stretching movement and expansion movement, and stability of the massager is enhanced.

In the embodiment, the guide tooth 21 is configured in a semi-circular arc shape, and a bottom of the semi-circular arc shape extends outward to form a guide column 211.

The driving shaft 22 is cylindrical, such as a cylinder or a cuboid.

A guide rail 221 surrounds an outer surface of the driving shaft 22. The semi-circular arc shape of the guide tooth 21 is clamped on the outer surface of the driving shaft 22.

In the embodiment, a first shaft through hole 242 and a plurality of surface housing through holes 243 are defined in the driving surface housing 24. A second shaft through hole 242 and a plurality of bottom housing through holes 231 are defined in the driving bottom housing 23, and the plurality of the bottom housing through holes 231 correspond to the plurality of the surface housing through holes 243.

In the embodiment, a plurality of driving columns 202 extend out from a top portion of the driving unit 20, the plurality of the driving columns 202 sequentially pass through the plurality of the bottom housing through holes 231 and the plurality of the surface housing through holes 243, and the driving shaft 22 sequentially passes through the second shaft through hole 242 in the driving bottom housing 23 and the first shaft through hole 242 in the driving surface housing 24.

In the embodiment, a first tooth groove 244 is defined at an edge, facing the first shaft through hole 242, of a bottom portion of the driving surface housing 24, a second tooth groove 232 is defined at an edge, facing the second shaft through hole 242, of a top portion of the driving bottom housing 23. The bottom portion of the driving surface housing 24 is stacked with the top portion of the driving bottom housing 23, a second cavity is defined in the first tooth groove 244 and the second tooth groove 232, and the guide tooth 21 is clamped in the second cavity.

In the embodiment, a control circuit board 19, a driving battery 26, a conductive pin fixing base 27, a conductive pin 28, and a control button 111 are disposed at a bottom portion of the massager. The driving battery 26 is electrically connected to the driving assembly 201. The conductive pin 28 is clamped in the conductive pin fixing base 27 and is electrically connected to the driving battery 26. The control circuit board 19 is electrically connected to the driving battery 26, the control button 111 is disposed on a surface of the control circuit board 19, and users may control vibration and stretching of the massager through the control button 111.

Different from the current massagers that the current massagers achieve functions of vibration and stretching through a simple direct current (DC) motor, the massager of the present disclosure is capable of stretching while expanding through a mechanism structure. The plurality of the elastic sheets are opened through the plurality of the inclined surfaces on the inclined expansion fastener, so that an overall diameter of one end of the flexible outer housing of the massager is increased, and the one end of the flexible outer housing of the massager is properly expanded and enlarged in a human body cavity, so that a contact area between the massager and human body skin is increased to bring more stimulus for the human body skin, and user experience may further be improved. The massager of the present disclosure solves problems of single linear stretching function and poor user experience.

While embodiments of the present disclosure have been shown and described, it should be understood by those of ordinary skill in the art that various changes, modifications, substitutions and variations can be made to these embodiments without departing from the principles and spirit of the present disclosure, which is defined by the appended claims and their equivalents.

What is claimed is:

1. A massager, comprising:

a flexible outer housing;

a driving housing; and an inclined expansion fastener;

wherein an upper end of the driving housing comprises a plurality of elastic sheets; a first cavity is defined at the upper end of the driving housing, and the inclined expansion fastener is partially disposed in the first cavity; when the inclined expansion fastener moves downward, the inclined expansion fastener opens the plurality of the elastic sheets, so that a diameter of the upper end of the driving housing is increased; and when the inclined expansion fastener moves upward, the inclined expansion fastener moves out of the first cavity at the upper end of the driving housing, the plurality of the elastic sheets rebound and reset, and the diameter of the upper end of the driving housing is restored.

2. The massager according to claim 1, wherein a groove is defined in the upper end of the driving housing to form a stretchable and movable cavity, and elastic sheet grooves are disposed at a bottom of the stretchable and movable cavity; the elastic sheet grooves penetrate through the stretchable and movable cavity and the upper end of the driving housing to form the plurality of the elastic sheets.

3. The massager according to claim 2, wherein widths of the elastic sheet grooves are consistent.

4. The massager according to claim 2, wherein widths of the elastic sheet grooves are inconsistent.

5. The massager according to claim 2, wherein a plurality of arc-shaped protrusions are disposed on an outward surface of each of the plurality of the elastic sheets, and heights of the plurality of the arc-shaped protrusions progressively decrease downward along a length direction of each of the plurality of the elastic sheets.

6. The massager according to claim 1, wherein the massager further comprises a driving assembly; the driving assembly comprises a driving unit, a guide tooth, a driving shaft, a driving bottom housing, and a driving surface housing; the driving surface housing is disposed on a surface of the driving assembly, the inclined expansion fastener is assembled at a top portion of the driving surface housing; and an outer surface of the driving surface housing extends outward to form a plurality of surface housing clamping columns.

7. The massager according to claim 6, wherein a fastener through hole is defined in the inclined expansion fastener, a plurality of fastener grooves are concavely disposed in the fastener through hole; the plurality of the surface housing clamping columns are clamped in the plurality of the fastener grooves, so as to complete assembly of the driving assembly and the inclined expansion fastener; when the driving assembly moves up and down, the plurality of the surface housing clamping columns clamped in the plurality of the fastener grooves drive the inclined expansion fastener to move up and down.

8. The massager according to claim 6, wherein the guide tooth is configured in a semi-circular arc shape, and a bottom of the semi-circular arc shape extends outward to form a guide column.

9. The massager according to claim 8, wherein the driving shaft is cylindrical, and a guide rail surrounds an outer surface of the driving shaft; the semi-circular arc shape of the guide tooth is clamped on the outer surface of the driving shaft.

10. The massager according to claim 9, wherein a first shaft through hole and a plurality of surface housing through holes are defined in the driving surface housing; a second shaft through hole and a plurality of bottom housing through holes are defined in the driving bottom housing; and the plurality of the bottom housing through holes correspond to the plurality of the surface housing through holes.

11. The massager according to claim 10, wherein a plurality of driving columns extend out from a top portion of the driving unit, the plurality of the driving columns sequentially pass through the plurality of the bottom housing through holes and the plurality of the surface housing through holes, and the driving shaft sequentially passes through the second shaft through hole in the driving bottom housing and the first shaft through hole in the driving surface housing.

12. The massager according to claim 9, wherein a first tooth groove is defined at an edge, facing the first shaft through hole, of a bottom portion of the driving surface housing; a second tooth groove is defined at an edge, facing the second shaft through hole, of a top portion of the driving bottom housing; the bottom portion of the driving surface housing is stacked with the top portion of the driving bottom housing, a second cavity is defined in the first tooth groove and the second tooth groove, and the guide tooth is clamped in the second cavity.

13. The massager according to claim 1, wherein a plurality of inclined surfaces extend outward from an outer portion of the inclined expansion fastener; the plurality of the inclined surfaces are surrounded on the outer portion of the inclined expansion fastener.

14. The massager according to claim 13, wherein an end of each of the plurality of the inclined surfaces facing the driving assembly is a first end, and an end of each of the plurality of the inclined surfaces facing an opposite position of the driving assembly is a second end; a height of the first end is lower than a height of the second end.

15. The massager according to claim 14, wherein a plurality of guide grooves are disposed on a surface of each of the plurality of the inclined surfaces, and a direction of each of the plurality of the guide grooves is consistent with a motion direction of the inclined expansion fastener.

16. The massager according to claim 15, wherein spacing grooves are disposed between the plurality of the inclined surfaces, and the spacing grooves separate the plurality of the inclined surfaces.

17. The massager according to claim 16, wherein a width of each of the spacing grooves is not less than a width of each of the plurality of the guide grooves.

18. The massager according to claim 17, wherein an annular platform is disposed at lower portions of the plurality of the inclined surfaces and surrounds the plurality of the inclined surfaces, a diameter of the annular platform is consistent with a diameter of the first cavity defined at the upper end of the driving housing.

19. The massager according to claim 18, wherein a height of the first end of each of the plurality of the inclined surfaces is not greater than a height of the annular platform.

* * * * *